(12) United States Patent
Wang et al.

(10) Patent No.: US 7,898,692 B2
(45) Date of Patent: Mar. 1, 2011

(54) ROSETTE PRINTING WITH UP TO FIVE COLORS

(75) Inventors: Shen-Ge Wang, Fairport, NY (US);
Robert P Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1126 days.

(21) Appl. No.: 11/565,455

(22) Filed: Nov. 30, 2006

(65) Prior Publication Data

US 2008/0130056 A1    Jun. 5, 2008

(51) Int. Cl.
*G06K 15/00* (2006.01)
(52) U.S. Cl. .......... 358/3.06; 358/1.9; 358/533; 358/536
(58) Field of Classification Search .................. None
See application file for complete search history.

(56) References Cited

U.S. PATENT DOCUMENTS

| | | | |
|---|---|---|---|
| 5,155,599 A | 10/1992 | Delabastita | |
| 5,323,245 A | 6/1994 | Rylander | |
| 5,370,976 A * | 12/1994 | Williamson et al. ..... | 430/358 |
| 5,371,612 A | 12/1994 | Sakamoto | |
| 5,583,660 A | 12/1996 | Rylander | |
| 5,870,530 A | 2/1999 | Balasubramanian | |
| 5,892,891 A | 4/1999 | Dalal et al. | |
| 6,798,539 B1 | 9/2004 | Wang et al. | |
| 6,972,871 B2 * | 12/2005 | Tsuda et al. ..... | 358/1.9 |
| 7,027,191 B1 * | 4/2006 | Steinhauer ..... | 358/3.2 |
| 7,675,651 B2 * | 3/2010 | Wang et al. ..... | 358/3.06 |
| 7,679,787 B2 * | 3/2010 | Wang et al. ..... | 358/3.06 |
| 2002/0089708 A1 * | 7/2002 | Cheng et al. ..... | 358/534 |
| 2003/0035145 A1 * | 2/2003 | Wang ..... | 358/3.06 |
| 2004/0109184 A1 | 6/2004 | Ishii | |
| 2004/0239967 A1 * | 12/2004 | Wen ..... | 358/1.9 |
| 2005/0243340 A1 * | 11/2005 | Tai et al. ..... | 358/1.9 |
| 2006/0066910 A1 * | 3/2006 | Yasutomi ..... | 358/3.13 |
| 2006/0170975 A1 | 8/2006 | Wang | |

OTHER PUBLICATIONS

T.M. Holladay, "An Optimum Algorithm for Halftone Generation Displays and Hard Copies", Proc. Soc. for Information Display, 21, p. 185 (1980). J. A. G. Yule, "Principles of Color Reproduction", John Wiley & Sons. N.Y. 1967.

* cited by examiner

*Primary Examiner* — Twyler L Haskins
*Assistant Examiner* — Javier J Ramos
(74) *Attorney, Agent, or Firm* — Philip E. Blair; Fleit Gibbons Gutman Bongini & Bianco P.L.

(57) ABSTRACT

Disclosed herein is a method and apparatus for moiré-free color halftone printing with up to five color image separations. The method and apparatus utilize a plurality of non-orthogonal halftone screens to produce outputs that are moiré free and form rosettes. The method and apparatus provide for defining a first and a second color halftone screen fundamental frequency vector for each of three halftone screens such that the halftone screen set output forms moiré-free rosettes; then defining a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens; and further defining a fifth color halftone screen where a first fundamental vector of the fifth screen shares a fundamental frequency vector with one of said three halftone screens and a second fundamental frequency vector of the fifth screen shares a fundamental frequency vector with a different one of said three color halftone screens, and the neither of the fundamental frequency vectors of the fifth screen are equal to either of the fundamental frequency vectors of the fourth screen.

20 Claims, 15 Drawing Sheets
(14 of 15 Drawing Sheet(s) Filed in Color)

ROSETTE PRINTING WITH UP TO FIVE COLORS

CROSS-REFERENCE TO COPENDING APPLICATIONS

Attention is directed to copending applications filed concurrently herewith: U.S. application Ser. No. 11/565,434, entitled "MOIRÉ-FREE COLOR HALFTONE CONFIGURATION EMPLOYING COMMON FREQUENCY VECTORS"; U.S. application Ser. No. 11/565/470, entitled "N-COLOR PRINTING WITH HEXAGONAL ROSETTES"; the disclosure found in these copending applications is hereby incorporated by reference in their entirety. The appropriate components and processes of the above copending applications may be selected for the teaching and support of the present application in embodiments thereof.

CROSS REFERENCE TO RELATED APPLICATIONS

Cross reference is made to the following applications, the disclosures of each of which are totally incorporated by reference herein: US Publication No. 2006/0170975 A1, entitled "MOIRÉ-FREE COLOR HALFTONE CONFIGURATION"; US Publication No. 2004/0109184 A1, entitled "IMAGE FORMING APPARATUS AND METHOD THEREOF". The appropriate components and processes of the above cross referenced applications may be selected for the teaching and support of the present application in embodiments thereof.

BACKGROUND AND SUMMARY

The teachings herein are directed to a method and apparatus for moiré-free halftoning color printing using combinations of up to five clustered-dot screens.

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified location or pixel. Digital halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel if the required color tone level is darker than the threshold halftone level, a color spot is printed at that specified pixel. Otherwise the color spot is not printed. The output of the screening process is a binary pattern of multiple small "dots", which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs", X-shapes, pinwheels, and pincushions, and actual printed dots can possess distortions and fragmentation of those idealized shapes introduced by digitization and the physical printing process. Various digital halftone screens having different shapes and angles are described in "*An Optimum Algorithm for Halftone Generation for Displays and Hard Copies*", by T. M. Holladay, Proc. Soc. for Information Display, 21, p. 185 (1980).

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies and harmonics of the individual color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. Additionally, lateral displacement misregistration can result in significant color shifts if an identical halftone screen is used for two color separations. To avoid, for example, two-color moiré patterns and other color shifts due to misalignment and misregistration, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color separations, it is desirable to avoid any two-color moiré as well as any three-color moiré. It is well known that in the traditional printing industry that three halftone screens, which can be constructed by halftone cells that are square in shape and identical, can be placed at 15o, 45o, and 75o, respectively, from a point and axis of origin, to provide the classical three-color moiré-free solution. This is described in "*Principles of Color Reproduction*", by J. A. G. Yule, John Wiley & Sons. N.Y. 1967.

However, for digital halftoning, the freedom to rotate a halftone screen is limited by the raster structure, which defines the position of each pixel. Since $\tan(15°)$ and $\tan(75°)$ are irrational numbers, rotating a halftone screen to 15° or 75° cannot be implemented exactly in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371, 612 discloses a moiré prevention method to determine screen angles and sizes that is usable solely for square-shaped, halftone screens.

U.S. Pat. No. 5,155,599 to Delabastita discloses a screening system and method for reproduction of images in printing. The screening angles that are used are close, but not identical to conventional screening angles. The reproduction is nevertheless Moiré free by the fact that the deviations in angles from the conventional system are exactly offset by the deviations in line rulings. The screening system is particularly advantageous when used for combinations of screens with rational tangent angles. The Moiré free combination of rational tangent screens can be rotated by a constant angle with the amount of rotation controlled in small increments.

U.S. Pat. No. 6,798,539 to Wang et al., discloses methods for using single-cell, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations.

The difficulty in avoiding moiré between halftone screens is further exacerbated by the common practice of printing four colors. Four-color printing typically employs halftoning methods for the yellow image separation that produce less than optimal image quality. Typical clustered-dot methods often possess some residual moiré. The typical clustered-dot yellow configuration assumes square halftone cells and places yellow at 0° with a frequency that is ≈10% higher than the other screens. Low contrast moiré can be seen in many printed images for certain combinations of yellow and other colorants. Another common configuration for yellow utilizes a stochastic screen or error diffusion for yellow. That configuration results in a high degree of instability when used on many different printers. The result is inconsistency of color page-to-page and non-uniformity of color within a page.

There are several high quality printing applications that require more than four image separations. For example, high fidelity ("hi-fi") color printing typically utilizes one or more additional primary colors to extend the gamut of a print engine. Two common choices of additional primaries are orange and green, but other colors, such as red, blue and violet may be used. A well known example of high fidelity printing is Pantone Hexachrome® printing. Low chroma printing employs an additional toner or ink with the same or similar hue as a conventional toner. For example, low chroma magenta may be used along with conventional magenta to enable smoother tone gradations and reduced texture in flesh tones compared to using conventional magenta alone. Typical low chroma, or light, colorants include light magenta, light cyan, and gray. Other >4 colorants printing methods may employ special colorants such as white, metallics and fluorescents, and may have applications in security and special imaging effects.

Due to moiré considerations associated with additional clustered-dot halftone screens, the alternatives currently available for fifth channel halftoning suffer from instability, less than desirable halftone structure appearance, or limitations on applications. For example, stochastic screens and error diffusion have been used for hi-fi color and low chroma toners, but the small dot sizes tend to produce unstable results for xerography and offset printing. Line screens have also been used, but the line structure tends to be considered undesirable unless used at very high frequencies, which can be unstable. Some methods utilize the same screen for a hi-fi colorant and for its complimentary colorant (e.g., same screen for cyan and orange), but that method can place limitations on the color management operations and does not apply to low chroma toners.

U.S. Pat. No. 5,870,530 to Balasubramanian discloses a "hi-fi" color printing system, wherein colorants of secondary colors beyond the regular CMYK primary colorants are available, the colorants of the secondary colors are substituted for combinations of the primary colorants in order to obtain a full color gamut. The functions by which colorants of the secondary colors are substituted for primary colorant are non-linear through a path in the color space.

U.S. Pat. No. 5,892,891 to Dalal et al. discloses a "hi-fi" color printing system, wherein colorants of hi-fi colors beyond the regular CMYK primary colorants are available, a main gamut obtainable with the CMYK colorants only is mutually exclusive with at least one extended gamut in which a hi-fi colorant is used and a complementary one of the CMY colorants is excluded. Because the main and extended gamuts are mutually exclusive, no more than four colorants are used in any part of the image, and no more than four halftone screens need be used to obtain any desired color.

The above indicated patents and citations provide background basis for the disclosure as taught in the specification which follows below, and further for each of the patents and citations above, the disclosures therein are totally incorporated herein by reference in their entirety for their teachings.

As provided herein, there are supplied teachings to systems and methods that combine clustered-dot screens in different color separations for moiré-free color halftoning with up to five screens.

Disclosed in embodiments herein is an image forming method for digitally reproducing a moiré-free color halftone image using a different halftone screen for each of five colors, the method comprising defining a first color halftone screen having a first fundamental frequency vector $V_{a1}=(V_{a1}, \theta_{a1})$, and second fundamental frequency vector $V_{a2}=(V_{a2}, \theta_{a2})$; defining a second color halftone screen having a first fundamental frequency vector $V_{b1}=(V_{b1}, \theta_{b1})$, and second fundamental frequency vector $V_{b2}=(V_{b2}, \theta_{b2})$; defining a third color halftone screen having a first fundamental frequency vector $V_{c1}=(V_{c1}, \theta_{c1})$, and second fundamental frequency vector $V_{c2}=(V_{c2}, \theta_{c2})$, where the vector angles obey the ordering $\theta_{ai}>\theta_{bi}>\theta_{ci}$; selecting the values of the fundamental frequency vectors to identify combinations that do not produce objectionable moiré by satisfying the following thresholds:

$$|V_{a1}-V_{b1}+V_{c2}| \leq V_{low} \text{ or } |V_{a1}-V_{b1}+V_{c2}| \geq V_{high}$$

and $$|V_{a2}-V_{b2}-V_{c1}| \leq V_{low} \text{ or } |V_{a2}-V_{b2}-V_{c1}| \geq V_{high}$$

where $V_{low}<0.5$ cycle/inch and $V_{high}>50$ cycles/inch; defining a fourth color halftone screen having a first fundamental frequency vector $V_{d1}=(V_1, \theta_{d1})$, and second fundamental frequency vector $V_{d2}=(V_{d2}, \theta_{d2})$; defining a fifth color halftone screen having a first fundamental frequency vector $V_{e1}=(V_{e1}, \theta_{e1})$, and second fundamental frequency vector $V_{e2}=(V_{e2}, \theta_{e2})$; selecting the values of the fundamental frequency vectors for the fourth screen and fifth screen to satisfy:

$$V_{d1}, V_{d2} \square [V_{a1}, V_{c1}, V_{b2}], V_{d2} \neq V_{d1}$$

$$V_{e1}, V_{e2} \square [V_{b1}, V_{a2}, V_{c2}], V_{e2} \neq V_{e1};$$

so that the set of five different halftone screens used in combination produce moiré-free halftone output.

Further disclosed in embodiments herein is a method for generating a plurality of non-orthogonal halftone screen outputs for moiré free color halftoning of five color image separations, the method comprising defining a first and a second color halftone screen fundamental frequency vector for each of a first, second, and third clustered dot halftone screen such that the halftone screen set output forms a rosette appearance free of objectionable moiré; defining a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens; defining a fifth color halftone screen where a first fundamental vector of the fourth screen shares a fundamental frequency vector with one of said three halftone screens and a second fundamental frequency vector of the fifth screen shares a fundamental frequency vector with a different one of said three color halftone screens, and neither first or second fundamental frequency vector of the fifth screen are equal to either of the first or second fundamental frequency vectors of the fourth screen.

Further disclosed in embodiments herein is a color halftoning screening apparatus for reproducing a moiré-free color halftone image using a five halftone screen set consisting of a halftone screen for each color, the apparatus comprising: a first color halftone screen having a first fundamental frequency vector $V_{a1}=(V_{a1}, \theta_{a1})$, and second fundamental frequency vector $V_{a2}=(V_{a2}, \theta_{a2})$; a second color halftone screen having a first fundamental frequency vector $V_{b1}=(V_{b1}, \theta_{b1})$, and second fundamental frequency vector $V_{b2}=(V_{b2}, \theta_{b2})$; a third color halftone screen having a first fundamental frequency vector $V_{c1}=(V_{c1}, \theta_{c1})$, and second fundamental frequency vector $V_{c2}=(V_{c2}, \theta_{c2})$, where the vector angles obey the ordering $\theta_{ai}>\theta_{bi}>\theta_{ci}$ and the values assigned said first and second color halftone screen fundamental frequencies being interrelated by $$|V_{a1}-V_{b1}+V_{c2}| \leq V_{low} \text{ or } |V_{a1}-V_{b1}+V_{c2}| \geq V_{high}$$

and $$|V_{a2}-V_{b2}-V_{c1}| \leq V_{low} \text{ or } |V_{a2}-V_{b2}-V_{c1}| \leq V_{high},$$

where $V_{low}<0.5$ cycle/inch and $V_{high}>50$ cycles/inch; a fourth color halftone screen having a first fundamental frequency vector $V_{d1}=(V_{d1}, \theta_{d1})$, and second fundamental frequency vector $V_{d2}=(V_{d2}, \theta_{d2})$; a fifth color halftone screen having a first fundamental frequency vector $V_{e1}=(V_{e1}, \theta_{e1})$, and second fundamental frequency vector $V_{e2}=(V_{e2}, \theta_{e2})$; where the values assigned to the first and second fundamental frequency vectors for the fourth and fifth screen are related to the fundamental frequency vectors for the first, second and third screens by:

$$V_{d1}, V_{d2} \in [V_{a1}, V_{c1}, V_{b2}], V_{d2} \neq V_{d1}$$

$$V_{e1}, V_{e2} \in [V_{b1}, V_{a2}, V_{c2}], V_{e2} \neq V_{e1}.$$

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DESCRIPTION

The teachings disclosed herein provide a color halftone configuration that produces rosettes free of moiré when printing 2, 3, 4 or 5 color halftone separations. With the halftone screen technology thus developed it is possible to design five clustered-dot halftone screens to generate moiré-free halftone outputs. The requirements for achieving these exemplary clustered-dot halftone screens are specified by several frequency-vector equations, which provide that at least 2 of the 5 halftone screens must share frequency vectors with other halftone screens. The frequency vector equations also comply with conventional requirements for multi-color moiré-free halftoning.

Figure 1:
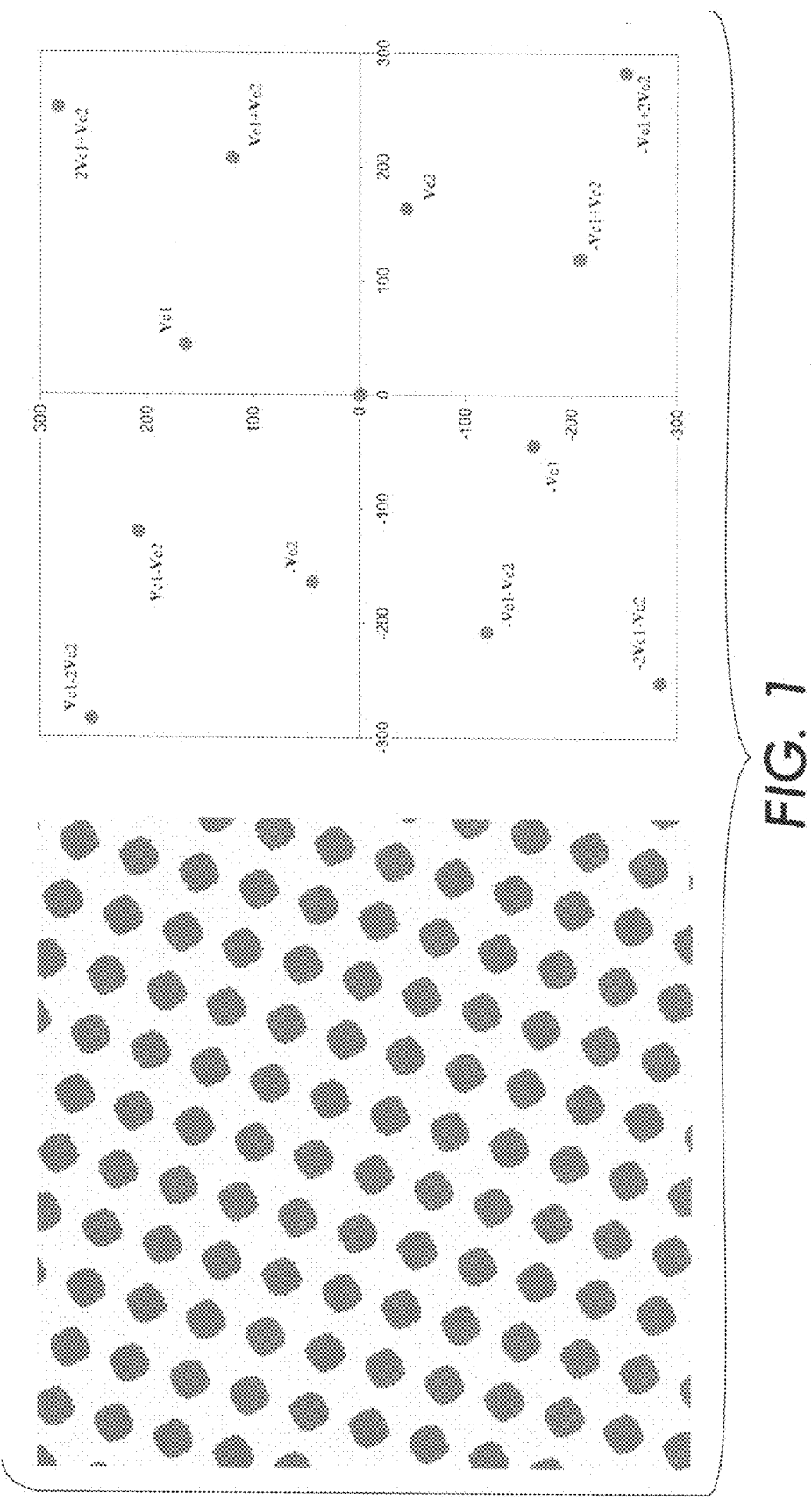
FIG. 1 depicts a halftone pattern created by the cyan screen of a color printing system, and along-side it the frequency representation for that cyan screen halftone pattern.
Figure 2:
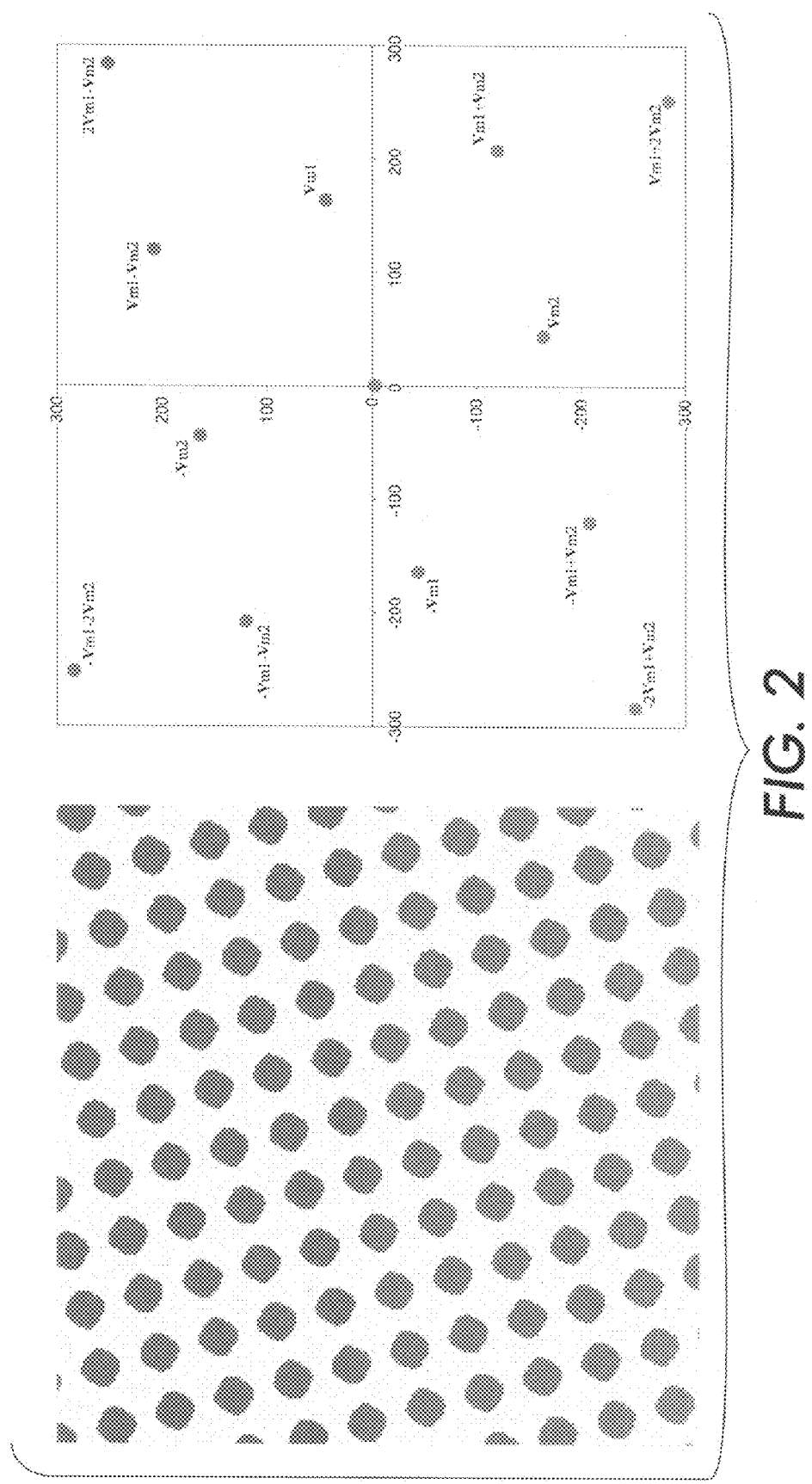
FIG. 2 depicts a halftone pattern created by the magenta screen of a color printing system, and along-side it the frequency representation for that magenta screen halftone pattern.
Figure 3:
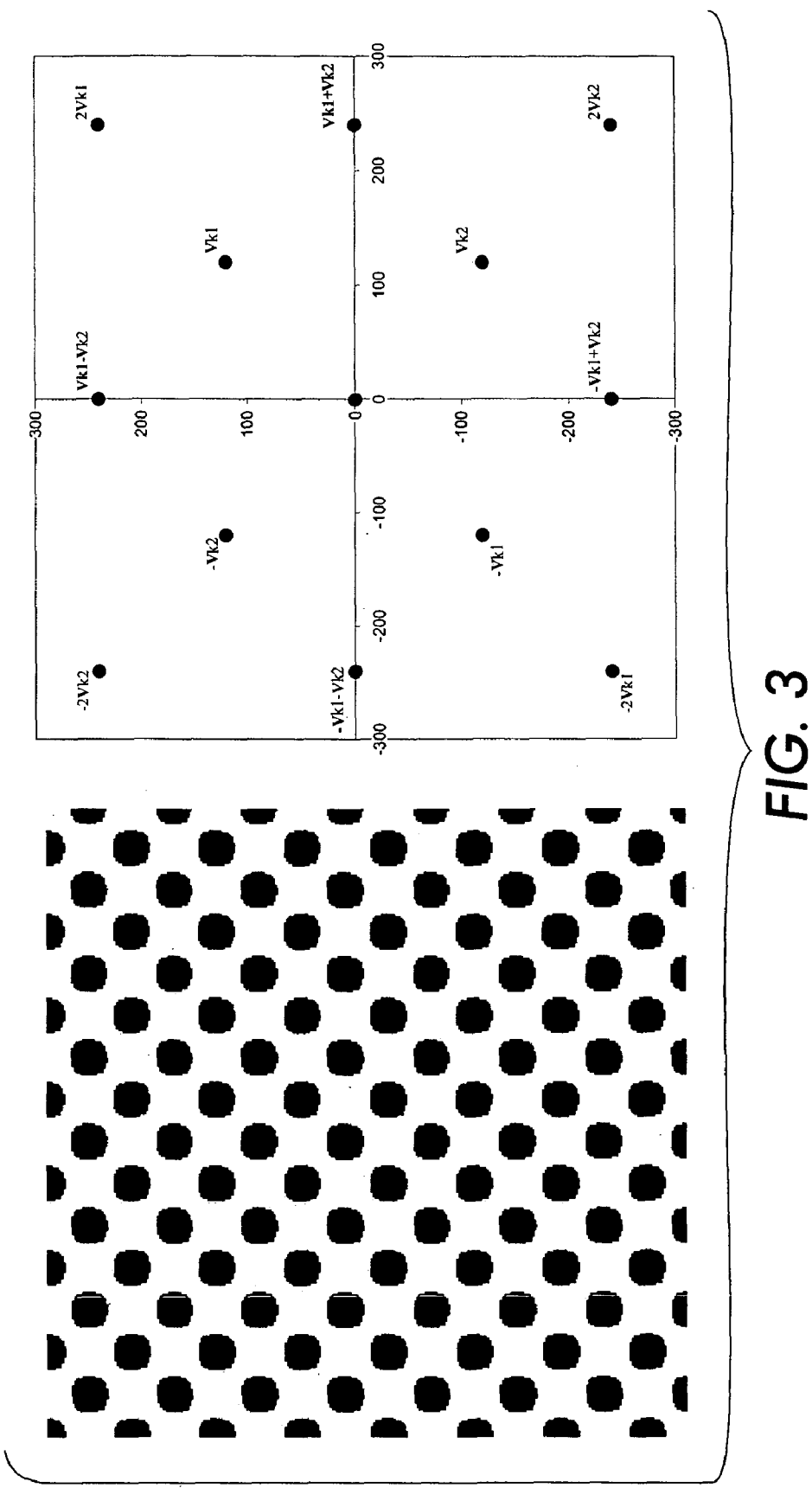
FIG. 3 depicts a halftone pattern created by the black screen of a color printing system, and along-side it the frequency representation for that black screen halftone pattern.

Most screening-based halftone methods use halftone screens in a two-dimensional tiling manner. Thus the corresponding halftone outputs possess strong periodic structures defined by the halftone screens. For example, in FIGS. 1-3 are three halftone patterns that demonstrate the outputs from a current exemplary color printer. The cyan pattern is the output of a 75° and −15° screen; the magenta pattern is the output of a, 15° and −75° screen; and the black is the output of a, 45° and −45° screen. All three patterns in FIGS. 1-3 show the halftone outputs as two-dimensional periodic structures (or quasi-periodical because of the multiple-dot-per cell, or super-cell approach) as the result of tiling square-shape screen cells.

Images can be also described by their Fourier transforms or their spatial frequency representations. As the result of tiling halftone screens, Fourier transforms of above halftone patterns in FIGS. 1-3 are dominated by discrete frequency components defined by the two fundamental halftone frequency vectors for each screen and their two-dimensional higher-order harmonics, or linear combinations of the fundamentals. For the following discussion in this specification, we use the notation illustrated by the transform plots in FIGS. 1-3 to represent the Fourier transform of halftone patterns. Only the locations of the fundamental halftone frequency vectors, $V_{c1}$, $V_{c2}$, $V_{m1}$, $V_{m2}$, $V_{k1}$, and $V_{k2}$, and some of their harmonics are shown in the spatial frequency coordinates as circular dots, and the amplitude and phase of each component are ignored in these illustrations. The sub 1 and sub 2 notation refers to vectors that are above (0° to 90°) or below (270° to 360°, or equivalently −90° to 0°) the 0° axis, respectively. We use this notation consistently within the present disclosure to represent the two quadrants. We use the subscripts c, m, y, and k, to aid in teaching the presently described halftoning processes due to the common practice of four-color printing with cyan, magenta, yellow, and black. While we teach using that notation, the concepts are general in that other colorants may be used. For example, we may use the notation $V_{m1}$ and use examples that refer to it as a frequency vector for the magenta screen, but it is to be understood that we intend it to generally imply a frequency vector in the first quadrant for some available colorant. Further, we note that colorants for particular screen geometries are interchangeable. For example, we may teach with yellow halftoned with a screen of a first geometry, and black halftoned with a screen of a second geometry, but it is practical and reasonable to assume that the screens may be interchanged and yellow may be halftoned with the screen of the second geometry and black the first.

The three plots in FIGS. 1-3 are the spatial frequency representations of the three halftone patterns in the figures, respectively. Of course, the halftones possess many higher order harmonics that are not shown in the plots due to limiting the range of the plots to ±300 cycles-per-inch in both directions to simplify the plots for teaching the relevant concepts.

Figure 4:
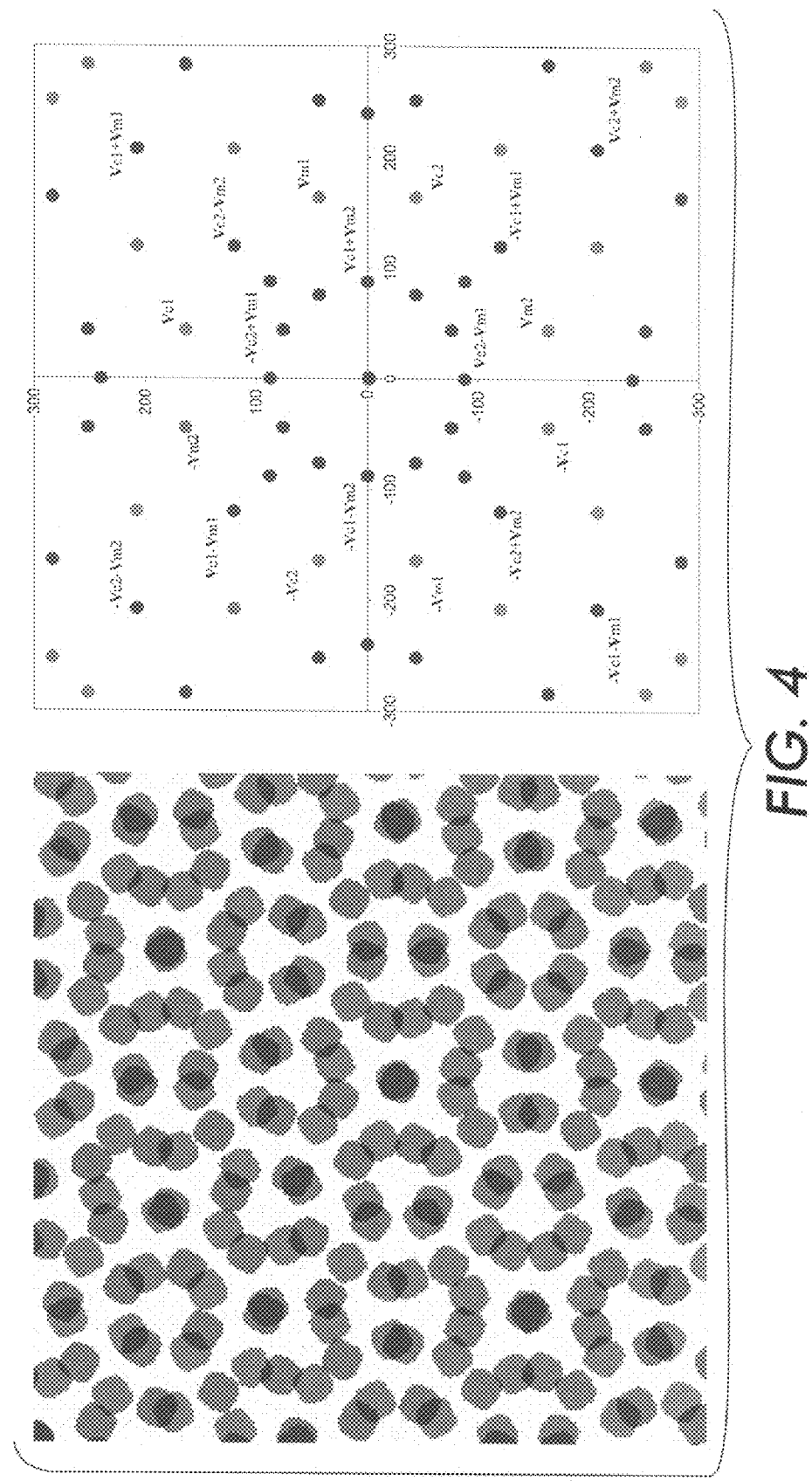
FIG. 4 depicts the superimposition of the cyan and magenta halftones as depicted in FIGS. 1 and 2 respectively, and along-side it the Fourier representation for that superimposition.

In color printing, more frequency components than the fundamental frequencies are typically created in the halftone image due to the superimposition of halftone screens for different process colors. Using Fourier analysis, we can express the result caused by such superimposition of two different colors as their frequency-vector difference, e.g., $V_{cm}=V_c \pm V_m$, where $V_x$ represents any one of $V_{x1}$, $-V_{x1}$, $V_{x2}$, $-V_{x2}$, and $V_{cm}$ is the combined vector. The sign definition of frequency vectors is rather arbitrary since each Fourier component has its conjugate, i.e., there is always a frequency vector $-V_c$ that represents the conjugate component of $V_c$. For each halftone dot screen, there are two fundamental frequency vectors, thus the color mixing of two screens for two different colors yields eight unique combined vectors for the fundamental frequency vectors alone. Considering the other harmonics of the halftone frequency vectors, the combinations can yield a large number of difference vectors. In FIG. 4, the superimposition of the cyan and magenta halftone patterns depicted in FIGS. 1 and 2 is shown on the left, and its frequency representation is on the right. Obviously, the frequency spectrum of the mixed colors is quite complicated and is certainly not a two-dimensional periodic function as is the single-color spectra shown in FIGS. 1 and 2, and this explains why the halftone pattern of the superimposition in FIG. 4 cannot be described as tiling a simple cell as it does in the simple monochromatic cases.

Figure 5:
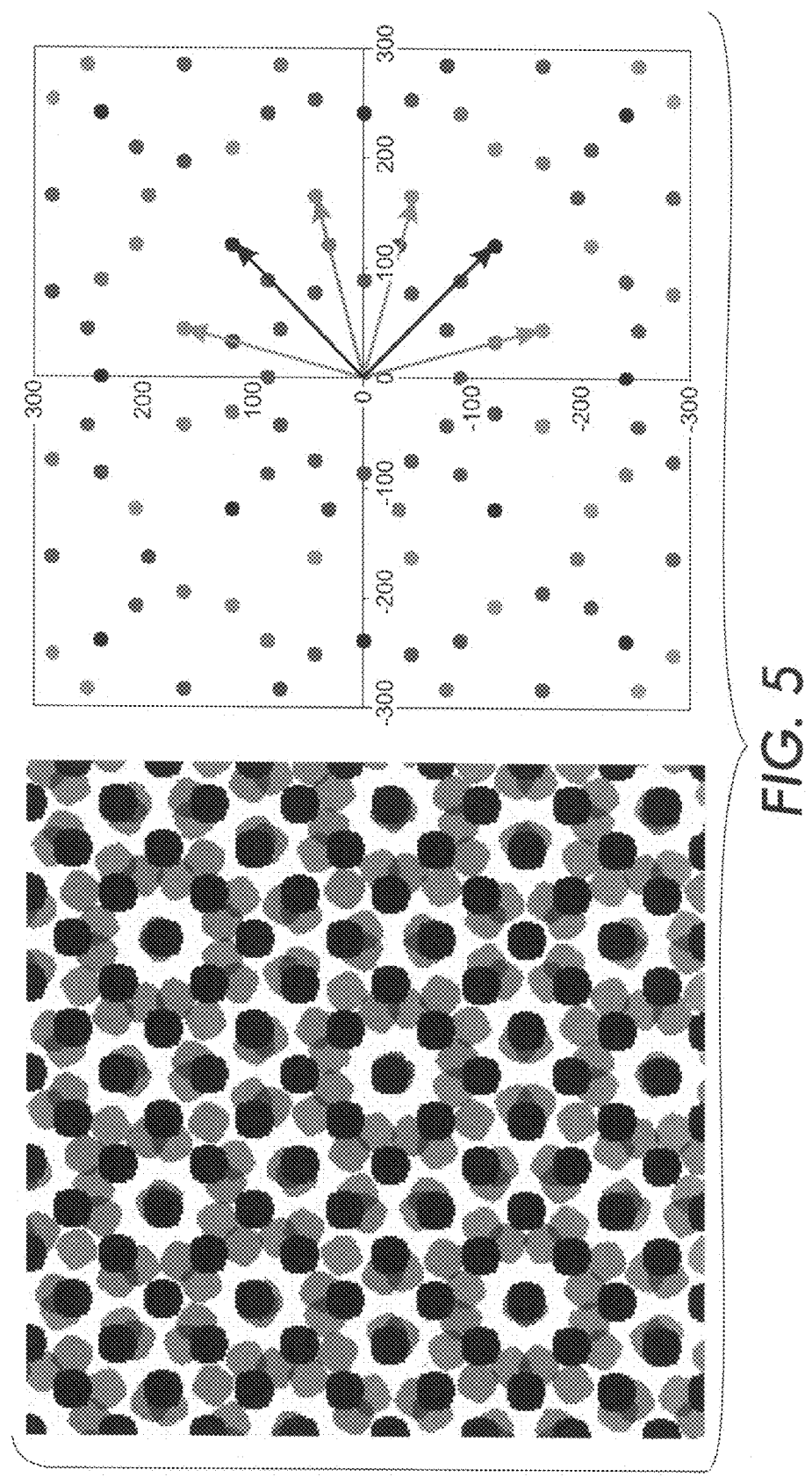
FIG. 5 depicts the superimposition of the cyan, magenta, and black halftones as depicted in FIGS. 1, 2, and 3, respectively, and along-side it the Fourier representation for that superimposition.

When the superimposition involves three colors, typically, cyan, magenta and black, the situation becomes even more complex. As shown in FIG. 5, the halftone pattern, often referred to as the rosette pattern, is not a simple repeated pattern and its Fourier representation is even more complicated than that for the two-color case. In traditional press printing, a same halftone screen is rotated to exactly 15°, 75° and 45° for cyan, magenta and black, respectively. It has been proven that the rosette pattern resulting from such a halftone configuration is theoretically non-periodic (J.A.C. Yule, "Principles of Color Reproduction"). In other words, the rosette pattern never repeats on the same page.

The common strategy to avoid objectionable two-color moiré is to select frequency vectors that ensure that no two-color difference vector of the fundamental halftone frequency vectors is sufficiently small, or short in length, to be perceived as a noticeably low frequency. The two-color moiré-free condition can be summarized by $$|V_c \pm V_m| > V_{high}, \qquad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{high}$ is a frequency limit set at somewhere between 50-70 cycles-per-inch for just noticeable moiré.

It is well known that a troublesome moiré is the three-color moiré, which can appear in cyan-magenta-black prints produced by CMYK four-color printers. As an extension of the two-color case, one aspect of the three-color moiré-free condition can be summarized by $$|V_c \pm V_m \pm V_k| > V_{high}, \qquad (2)$$

where $V_k$ represents any one of $V_{k1}$, $-V_{k1}$, $V_{k2}$, $-V_{k2}$; and $V_{high}$ is set similar to the two-color case. Since there are altogether thirty-two unique combinations of different color components for the left side of the inequality of Equation (2), it stands as a matter of practicality that to make all three-color difference vectors as well as all two-color difference vectors large enough to avoid any color moiré is very difficult, unless the halftone screens have very high frequency fundamentals, say higher than 200 line-per-inch. Another aspect of the moiré-free condition is to make two of the three-color difference vectors null while keeping the rest large. Given that both the signs and the indices of frequency vectors are defined somewhat arbitrarily, without losing the generality, the three-color moiré-free condition can be specified by the following vector equation:

$$V_{c1} - V_{m1} + V_{k2} = 0, \quad (3a)$$

or, equivalently due to the conventional screen configuration, $$V_{c2} - V_{m2} - V_{k1} = 0. \quad (3b)$$

Figure 6A:
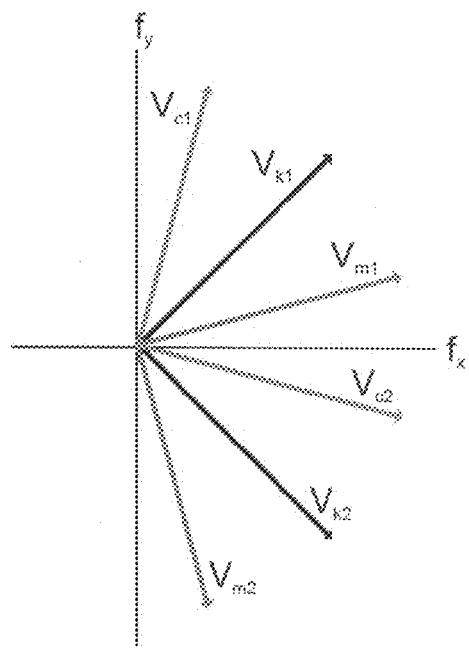
FIG. 6 depicts the fundamental frequency vectors of the cyan, magenta, and black halftones depicted in FIGS. 1, 2 and 3, respectively.
Figure 6B:
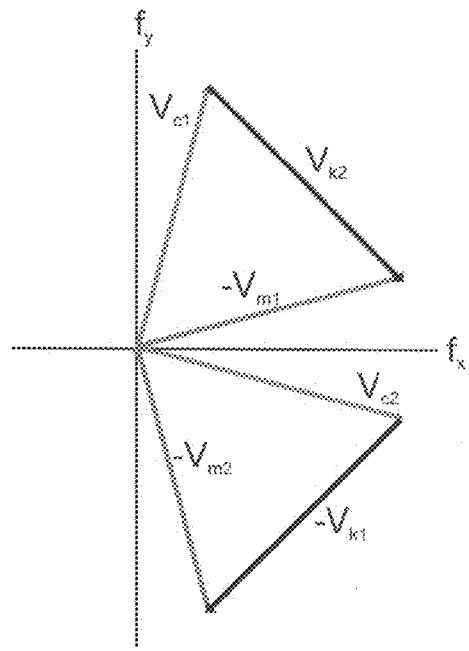

The Equations (3a) and (3b), are two of all possible frequency combinations of the three colors. In most practical applications, the rest of the combinations satisfy the inequality of Equation (2) for $V_{high}$ as large as MIN[$|V_c|$, $|V_m|$, $|V_k|$] and are not specially specified, and the combination of halftone outputs produce a rosette appearance rather than objectionable moiré. The vector additions of Equation 3 are illustrated in FIG. 6.

Most conventional halftone screens use square-shape halftone cells for tiling. Therefore, the two fundamental frequency vectors of each screen are not independent to each other. Once one of the two equations, either (3a) or (3b) is satisfied, the other one is automatically held. Recently, Wang et al. has taught halftone methods (U.S. Pat. No. 6,798,539, Wang et al. as incorporated by reference above) using non-orthogonal halftone cells to construct halftone screens, or general parallelogram-shape halftone cells, for moiré-free color halftoning, in which case the two fundamental frequency vectors of each parallelogram-shape-based screen are independent to each other and thus satisfying both Equations (3a) and (3b) is required for the three-color moiré-free condition. We note that the term "non-orthogonal" as used in the present specification here refers to "not necessarily square," which is less restrictive than "strictly not orthogonal". Such terminology follows convention used in mathematics, where terms such as "non-linear" refers to "not necessarily linear".

The teaching provided herein utilizes multiple non-orthogonal clustered-dot screens in an exemplary configuration to achieve moiré-free halftone outputs with up to five clustered-dot halftone screens. Certain frequency vector conditions must be satisfied for such outputs and they can be specified either in the spatial domain, where shapes of halftone cells for different colors are defined by spatial vectors, or in the frequency domain, where halftone screens are specified by frequency vectors. In the disclosure that follows, these certain conditions to be satisfied will be specified in the frequency domain by use of frequency vectors.

Figure 7A:
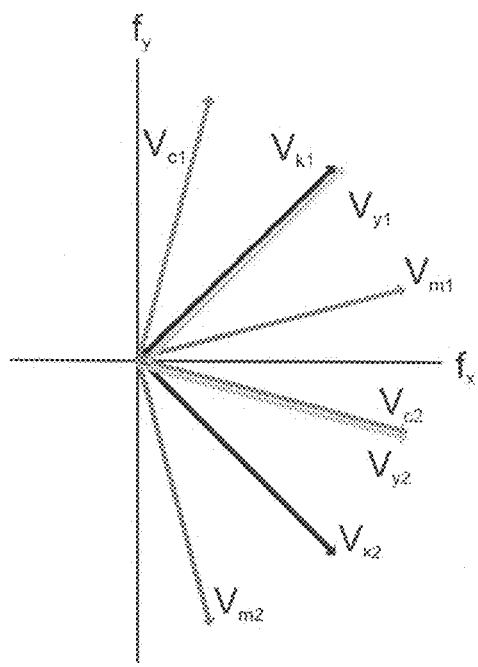
FIG. 7 depicts the fundamental frequency vectors of the cyan, magenta and black halftones of FIG. 6, along with shared frequency vectors for yellow.
Figure 7B:
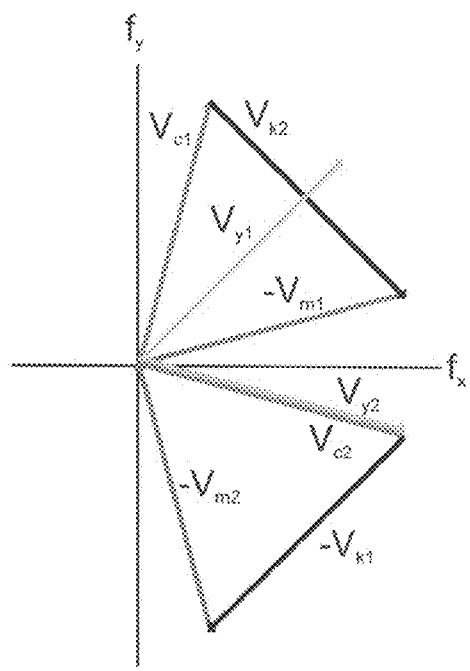

The moiré-free conditions of Equations (1)-(3) can be extended to 4-color screens by employing frequency vector sharing concepts. Ishii in US Publication No. 2004/0109184 A1, includes a fourth screen in a moiré-free manner by setting its frequency vectors to be the same as the frequency vectors of two other screens (e.g., $V_{y1} = V_{k1}$, $V_{y2} = V_{c1}$). Since no new frequency vectors are added to the system, no new moiré components are generated. Also note that the fourth screen shares vectors from two different screens, so it is angularly displaced from any one screen. This angular displacement allows the screen to possess a degree of color-shift insensitivity to misregistration similar to other rotated screen designs. Further, note that at least one screen must not be orthogonal to achieve such frequency vector sharing. An example of inclusion of yellow to cyan, magenta, and black by frequency vector sharing is shown in FIG. 7. In this example, conventional angles and frequencies are used for c, m and k, while y is included as a non-orthogonal screen.

Consider a much more challenging requirement to print up to five clustered-dot halftone image separations moiré-free, while possessing desirable appearing rosettes. In other words, we require the overlay of five two-dimensionally spatially periodic functions to possess beats (moiré) that fall into visually acceptable ranges. Additionally, we require that no two screens are identical so as to avoid color-shift sensitivity to misregistration. The current five-color printing practices of using stochastic screens, error diffusion, line screens or complimentary color screen substitution all possess limitations as mentioned above. According to the teachings herein, a clustered dot halftone screen configuration can be specified to meet the moiré-free goals by defining appropriate moiré restrictions via halftone frequency vector addition equations and defining suitable frequency vector sharing criteria.

Figure 8:
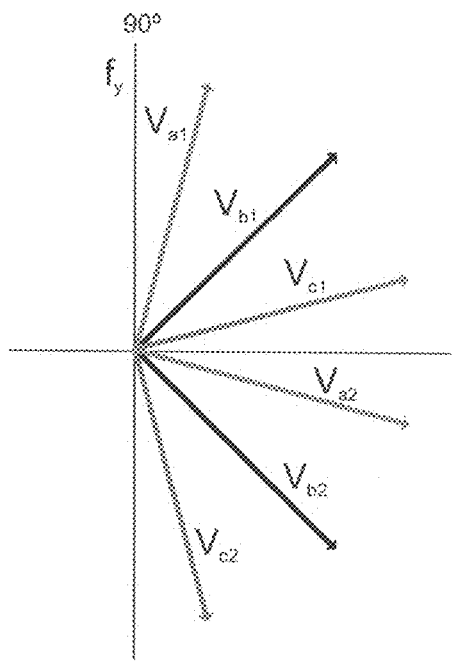
FIG. 8 depicts the fundamental frequency vectors of the a, b and c colorant halftones.

Consider orthogonal halftone screens for three colorants, a, b, c, in a conventional moiré-free configuration. Each screen possesses first and second frequency vectors $V_{x1} = (V_{x1}, \theta_{x1})$, $V_{x2} = (V_{x2}, \theta_{x2})$, where sub x denotes colorant, respectively, $V_{xi}$ denotes vector length and $\theta_{xi}$ denotes vector angle. By symmetry, the negative of those frequency vectors also exist. Assume the vector angles obey the ordering $\theta_{ai} > \theta_{bi} > \theta_{ci}$. An illustration of these frequency vectors is provided in FIG. 8. Due to the conventional orthogonality requirement, $V_{x1}$ and $V_{x2}$ are of equal length to within a tolerance of 0.5% and rotated from each other by 90°. The moiré-free condition can be stated as $$V_{a1} - V_{b1} + V_{c2} = 0, \quad (4a)$$

or, equivalently due to the conventional screen configuration, $$V_{a2} - V_{b2} - V_{c1} = 0. \quad (4b)$$

Consider screens for two additional colorants d and e, each screen being non-orthogonal. Each screen possesses first and second frequency vectors $V_{x1} = (V_{x1}, \theta_{x1})$, $V_{x2} = (V_{x2}, \theta_{x2})$, where sub x denotes colorant, $V_{xi}$ denotes vector length and $\theta_{x2}$ denotes vector frequency. By symmetry, the negative of those frequency vectors also exist. The five screen combination is moiré free if the fourth and fifth screens share vectors such that each of $V_{d1}$ and $V_{d2}$ are set equal to one of $V_{a1}$, $V_{c1}$, $V_{b2}$ and $V_{d1} \neq V_{d2}$, and each of $V_{e1}$ and $V_{e2}$ are set equal to one of $V_{b1}$, $V_{a2}$, $V_{c2}$ and $V_{e1} \neq V_{e2}$. The fundamental frequency vectors for these screens may be expressed mathematically as being drawn from a three element set:

$$V_{d1}, V_{d2} \square [V_{a1}, V_{c1}, V_{b2}], V_{d2} \neq V_{d1} \quad (5a)$$

$$V_{e1}, V_{e2} \square [V_{b1}, V_{a2}, V_{c2}], V_{e2} \neq V_{e1}. \quad (5b)$$

Figure 9:
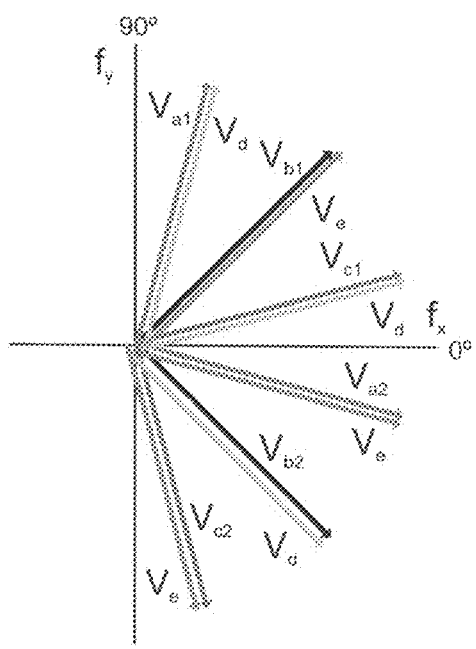
FIG. 9 depicts the fundamental frequency vectors of the a, b, c, d, and e colorant halftones.

FIG. 9 illustrates the fundamental frequency vectors for halftone screens for colorants a, b, c, d, and e. The set of vectors from which fundamental frequency vectors for colorants d and e may be chosen are labeled $V_d$ and $V_e$, respectively. While the screens for colorants a, b, and c can be a conventional moiré-free configuration, the screens for colorants d and e must be strictly non-orthogonal.

An examination of the three element sets reveals an interesting inter-relationship. By selecting any two vectors of either of the three element sets, the third vector in the respective set is generated by linear combinations of the two, and thus is present in the frequency spectrum of the screen. The third vector has the same frequency magnitude as the two selected vectors. When three such vectors are equal or approximately equal, the halftone cell could be described as having a hexagonal shape that is hexagonally tiled to fill the image plane. For this type of non-orthogonal screen, any two of the three frequency vectors can be considered fundamental frequency vectors and the third can be considered an alternative fundamental frequency vector and should be considered when performing moiré analysis on fundamental frequency vectors.

One particular set of screens has been designed that satisfies the moiré-free conditions of Equations (4) and (5) for using up to five clustered dot screens. Below are the frequency vectors for the exemplary halftone screen set. All frequency components are measured in units of cycles-per-inch (cpi), and frequency angles are defined with respect to the horizontal y-axis.

Colorant a, Cyan: $V_{c1}$=170 cpi @ 75° $V_{c2}$=170 cpi @−15°
Colorant b, Black: $V_{k1}$=170.0 cpi @ 45° $V_{k2}$=170 cpi @−45°
Colorant c, Magenta: $V_{m1}$=170 cpi @ 15° $V_{m2}$=170 cpi @−75°
Colorant d, Yellow: $V_{y1}$=$V_{k1}$ $V_{y2}$=$V_{c2}$
  $V_{y1}$+$V_{y2}$=$V_{m2}$=170 cpi @−75° (alternative fundamental frequency)
Colorant e, Red: $V_{r1}$=$V_{c1}$ $V_{r2}$=$V_{k2}$
  $V_{r1}$+$V_{r2}$=$V_{m1}$=170 cpi @ 15° (alternative fundamental frequency)

We describe and illustrate this set of screens using colorants cyan, magenta, black, yellow, and red. This choice of colorants used in the example is not intended to be limiting in any way. Rather, this set of colorants is used here as a visual aid in teaching the present concepts due to the clarity that those colorants provide in viewing the screens and superimpositions.

Figure 10:
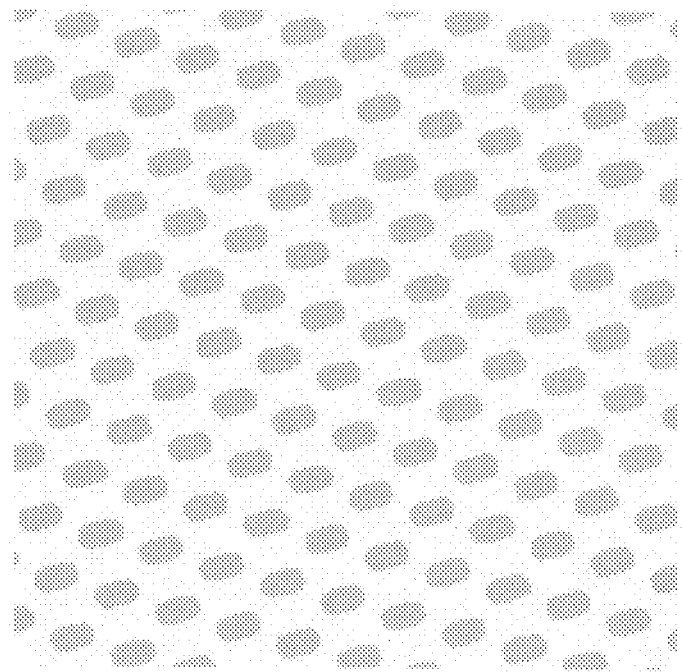
FIG. 10 depicts an exemplary halftone pattern created by the yellow screen of a color printing system color system according to the teachings herein.
Figure 11:
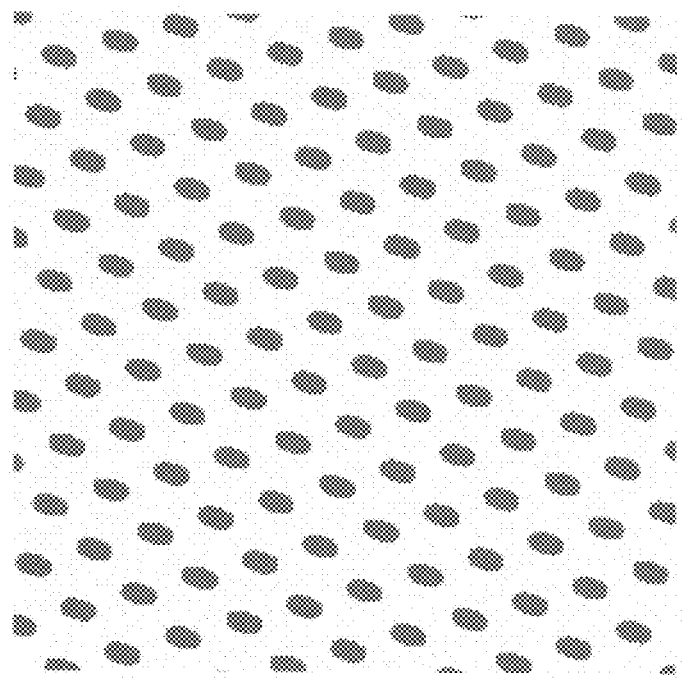
FIG. 11 depicts an exemplary halftone pattern created by the red screen of a color printing system color system according to the teachings herein.
Figure 12:
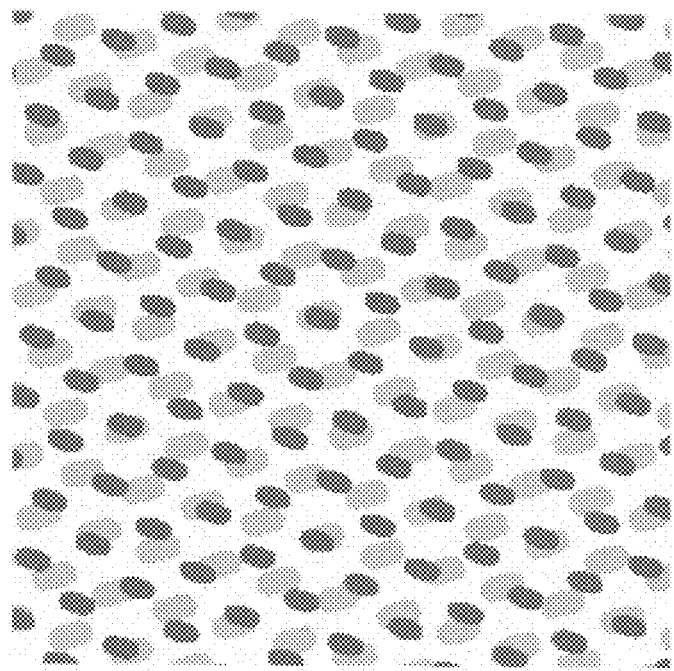
FIG. 12 depicts the superimposition of the yellow and red orange exemplary halftones as depicted in FIGS. 10, and 11, respectively.
Figure 13:
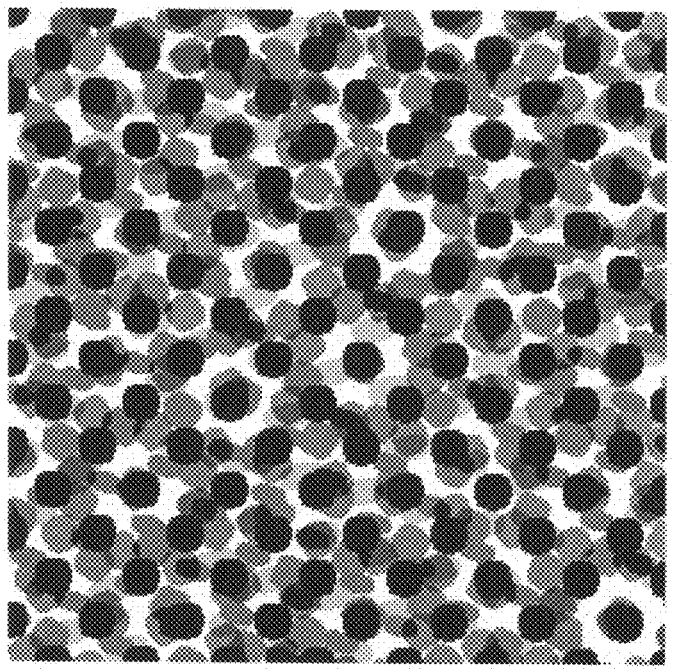
FIG. 13 depicts the superimposition of the cyan, magenta, black, yellow and red exemplary halftones as depicted in FIGS. 1, 2, 3, 10, and 11, respectively.
Figure 14:
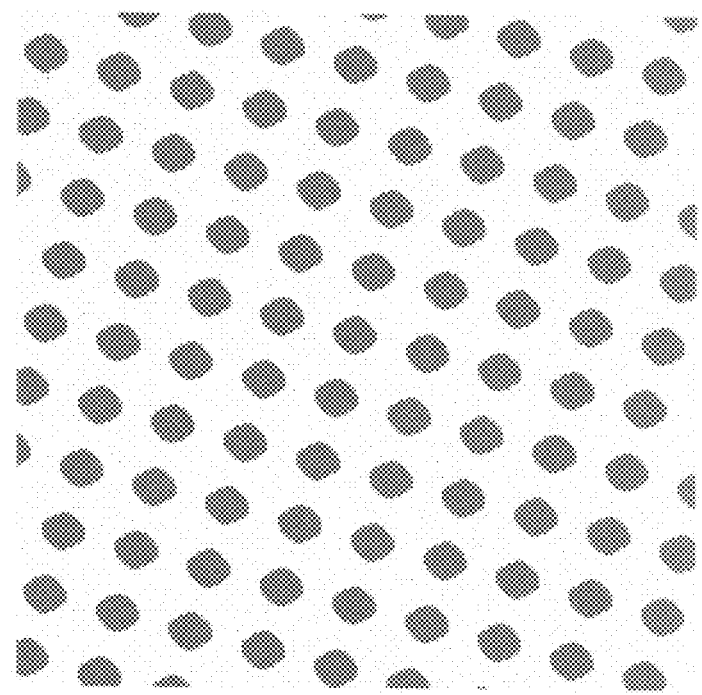
FIG. 14 depicts an exemplary halftone pattern created by the magenta screen of a color printing system color system according to the teachings herein.
Figure 15:
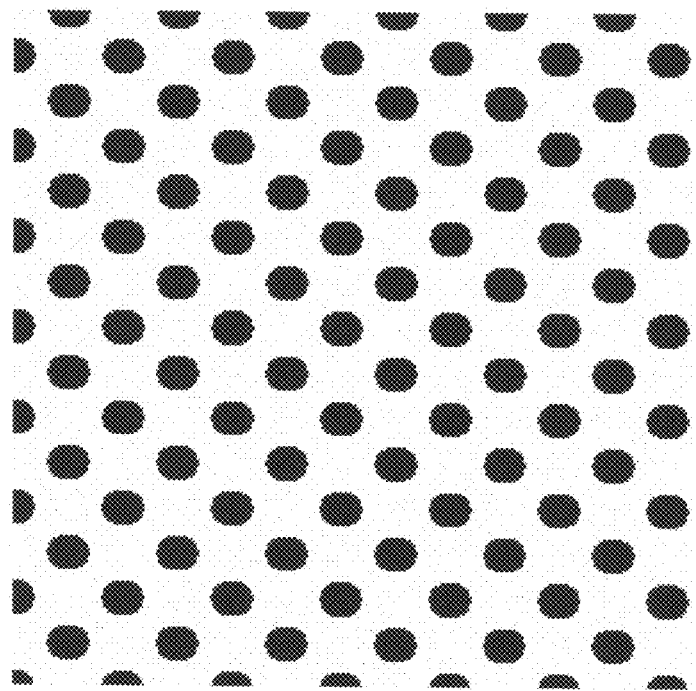
FIG. 15 depicts an exemplary halftone pattern created by the black screen of a color printing system color system according to the teachings herein.
Figure 16:
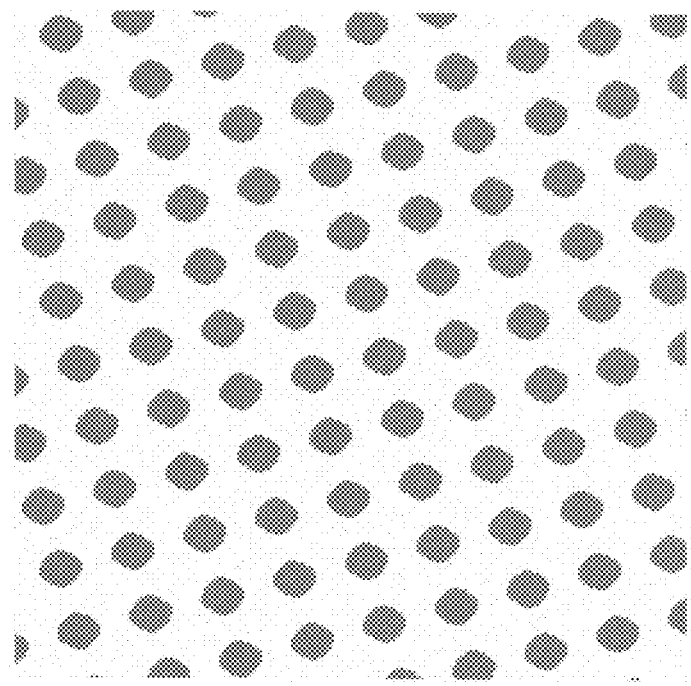
FIG. 16 depicts an exemplary halftone pattern created by the cyan screen of a color printing system color system according to the teachings herein.
Figure 17:
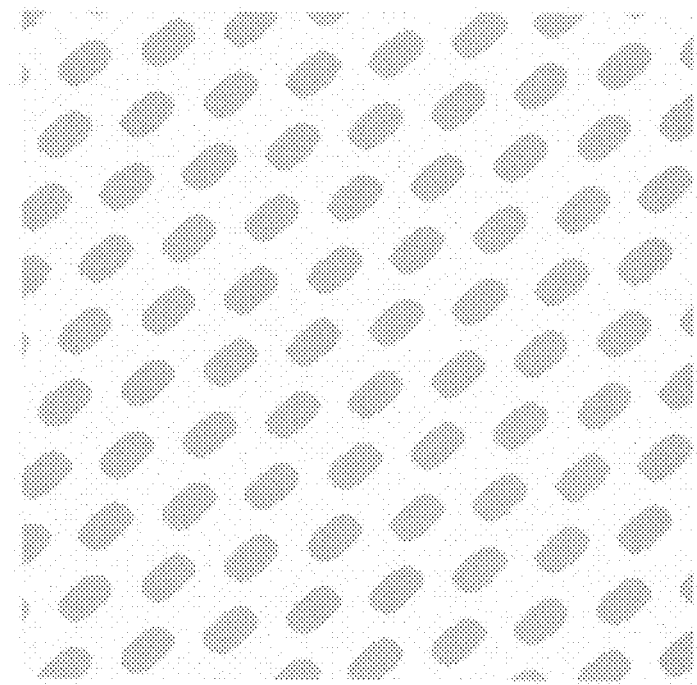
FIG. 17 depicts an exemplary halftone pattern created by the yellow screen of a color printing system color system according to the teachings herein.
Figure 18:
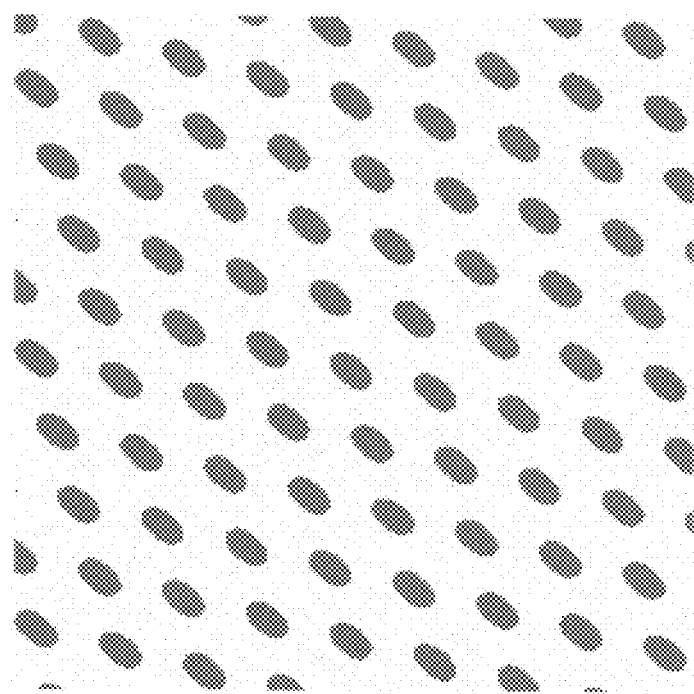
FIG. 18 depicts an exemplary halftone pattern created by the red screen of a color printing system color system according to the teachings herein.

FIGS. 1, 2 and 3 illustrated the screens used in the present example for cyan, magenta and black respectively. FIGS. 10 and 11 illustrate screens used for yellow and red in the present example. FIG. 12 shows the superimposition of the yellow and red screens and FIG. 13 shows the superimposition of all 5 screens. The figures show halftone output for gray levels that require roughly 40% to 60% area coverage of halftone dots. In these superimpositions we see that no objectionable moiré is present, which is due to the moiré-free requirement and vector sharing requirements of Equations (4) and (5), respectively.

The examples for moiré-free rosette printing described above used specific colorants, but the halftone configuration taught here may be generally applied to any five colorants. For instance, the set of colorants employed in the configuration may include any five of conventional subtractive primaries (cyan, magenta, black and yellow), light or hue-shifted versions of those primaries, "high-fidelity" colorants (e.g., orange, green, violet, turquoise, emerald, red, blue), gloss toners, white, metallics, Hexachrome® Pantone colorants, fluorescents, magnetic marking materials, and other colorants and marking materials available to printing processes.

Printing applications for the five-halftone configuration taught here can include, and are not limited to, high quality graphic arts printing, photo-quality printing, special effects printing, and document security applications.

Consider a more general halftone configuration, where none of the screens are constrained to be orthogonal and $V_{x1}$ and $V_{x2}$ and not constrained to be of equal length. Further, moiré can be allowed to exist below a certain frequency threshold $V_{low}$ or above a frequency threshold $V_{high}$. Satisfying these limits allows a screen configuration to be free of moiré for practical printing and viewing conditions while not being strictly mathematically moiré-free across all frequencies. Consider non-orthogonal halftone screens for three colorants, a, b, c, in a conventional moiré-free configuration. Each screen possesses first and second frequency vectors $V_{x1}$=$(V_{x1}, \theta_{x1})$, $V_{x2}$=$(V_{x2}, \theta_{x2})$, $V_{xi}$ denotes vector length and $\theta_{x2}$ denotes vector angle. By symmetry, the negative of those frequency vectors also exist. Assume the vector angles obey the ordering $\theta_{ai}$>$\theta_{bi}$>$\theta_{ci}$. Due to the conventional orthogonality requirement, $V_{x1}$, and $V_{x2}$ are of equal length to within a tolerance of 0.5% and rotated from each other by 90°. The moiré-free condition can be stated as for three colorants a, b, and c, the moiré-free can be stated as $$|V_{a1}-V_{b1}+V_{c2}| \leq V_{low} \text{ or } |V_{a1}-V_{b1}+V_{c2}| \geq V_{high} \quad (6a)$$

and $$|V_{a2}-V_{b2}-V_{c1}| < V_{low} \text{ or } |V_{a2}-V_{b2}-V_{c1}| \leq V_{high} \quad (6b)$$

Note that the conventional orthogonal configuration possessed simpler requirements [the two equations of Eq. (4) where equivalent] due to the equal length vectors and 90° angles. In the present non-orthogonal example, both Equations (6a) and (6b) must be satisfied to ensure that the configuration is moiré free. Equation. (6) requires the magnitude of vector sums to be below a threshold $V_{low}$, such as 0.5 cycles/inch, or above a threshold $V_{high}$, such as 50 cycles/inch. When satisfying the lower threshold, ideally, it is desirable for the summation of Equation (6) equal 0, but practical solutions within the scope of the present invention allow the magnitude of the vector sum to be small, below a specified threshold, such as <0.5 cycle/inch.

Methods are known in the art to design screens according to the specifications of Equation (6). Wang et al., U.S. Pat. No. 6,798,539, and Delabastita, U.S. Pat. No. 5,155,599, are examples of methods that may be used to design screens that satisfy Eq. (6).

Consider screens for two additional colorants d and e, each screen being non-orthogonal. Each screen possesses first and second frequency vectors $V_{x1}$=$(V_{x1}, \theta_{x1})$, $V_{x2}$=$(V_{x2}, \theta_{x2})$, $V_{xi}$ denotes vector length and $\theta_{x2}$ denotes vector frequency. By symmetry, the negative of those frequency vectors also exist. The five screen combination is moiré free if the fourth and fifth screens share vectors such that each of $V_{d1}$ and $V_{d2}$ are set equal to one of $V_{a1}$, $V_{c1}$, $V_{b2}$ and $V_{d1} \neq V_{d2}$, and each of $V_{e1}$ and $V_{e2}$ are set equal to one of $V_{b1}$, $V_{a2}$, $V_{c2}$ and $V_{e1} \neq V_{e2}$. The fundamental frequency vectors for these screens may be expressed mathematically as being drawn from a three element set:

$$V_{d1}, V_{d2} \square [V_{a1}, V_{c1}, V_{b2}], V_{d2} \neq V_{d1} \quad (7a)$$

$$V_{e1}, V_{e2} \square [V_{b1}, V_{a2}, V_{c2}], V_{e2} \neq V_{e1}. \quad (7b)$$

Including a fourth and fifth screen via frequency vector sharing in this manner results in adding no new frequency vectors to the system, hence no new moiré components are generated. Also, the first and second frequency vectors of the fourth screen share vectors from two different screens, so it is angle- and frequency-displaced from any one screen. Additionally, the first and second frequency vectors of the fifth screen share vectors from two different screens and are not equal to the frequency vectors of the fourth screen, so the fifth screen is also angle- and frequency-displaced from any one screen. This angle- and frequency-displacement allows the screen to possess color-shift insensitivity to misregistration similar to other rotated screen designs.

While any and possibly all the screens may be non-orthogonal, it is interesting to note that such a five screen frequency-vector-sharing halftone configuration can be only realized by using at least two screens that are strictly non-orthogonal, or parallelogram, in shape. The combination of the moiré-free condition and the frequency vector sharing requires independent first and second fundamental frequency vectors for at least two screens.

One particular set of screens has been designed that satisfies the moiré-free conditions of Equations (6) and (7) for using up to five non-orthogonal clustered dot screens. Below are the frequency vectors for the exemplary halftone screen set.

Colorant a, Magenta: $V_{m1}$=170 cpi @ 76° $V_{m2}$=170 cpi @-16°

Colorant b, Black: $V_{k1}$=156.0 cpi @ 50° $V_{k2}$=170 cpi @-50°

Colorant c, Cyan: $V_{c1}$=146 cpi @ 16° $V_{c2}$=170 cpi @-76°

Colorant d, Yellow: $V_{y1}$=$V_{k1}$ $V_{y2}$=$V_{c2}$ $V_{y1}$+$V_{y2}$=$V_{m2}$=146 cpi @-16° (alternative fundamental frequency)

Colorant e, Red: $V_{r1}$=$V_{c1}$ $V_{r2}$=$V_{k2}$ $V_{r1}$+$V_{r2}$=$V_{m1}$=165 cpi @ 76° (alternative fundamental frequency)

Figure 19:
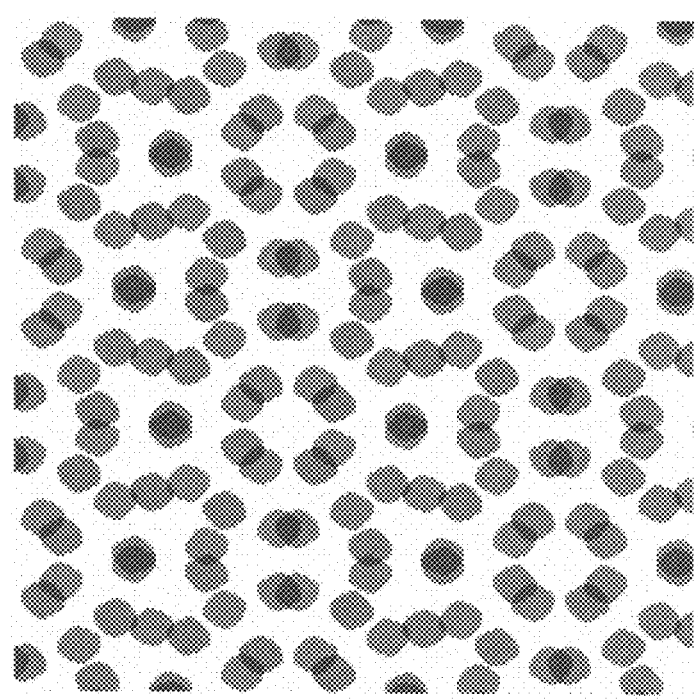
FIG. 19 depicts the superimposition of the cyan and magenta exemplary halftones according to the teachings herein.
Figure 20:
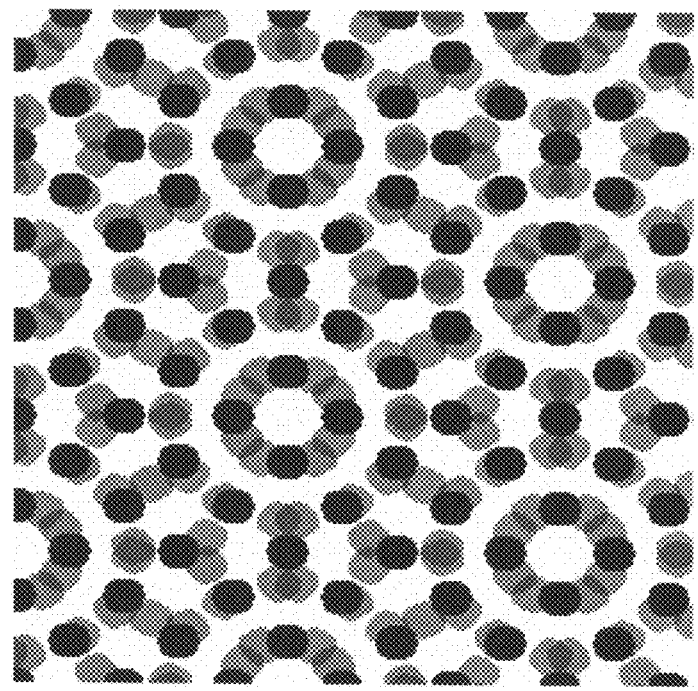
FIG. 20 depicts the superimposition of the cyan, magenta and black exemplary halftones according to the teachings herein.
Figure 21:
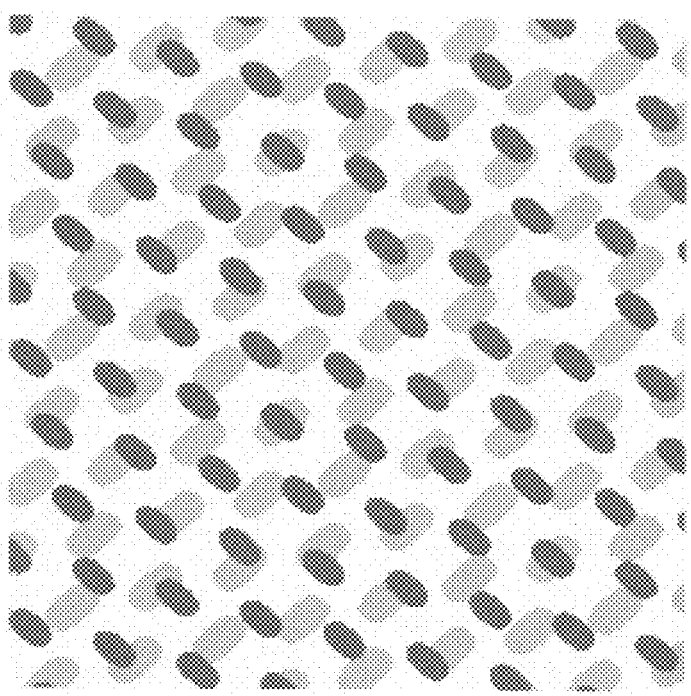
FIG. 21 depicts the superimposition of the yellow and red exemplary halftones according to the teachings herein.
Figure 22:
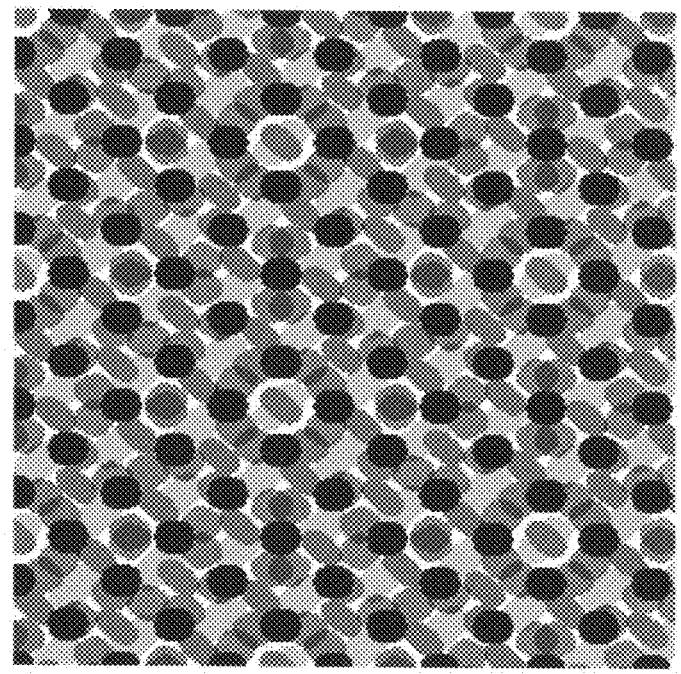
FIG. 22 depicts the superimposition of the cyan, magenta, black, yellow and red exemplary halftones according to the teachings herein.

FIGS. 14-18 illustrate the screens used for colorant a, b, c, d, and e, respectively. FIG. 19 illustrates the superimposition of the screens used for colors a and c, FIG. 20 illustrates the superimposition of the screens used for colors a, b and c, FIG. 21 illustrates the superimposition of the screens used for colors d and e, and FIG. 22 shows the superimposition of all 5 screens. The figures show halftone output for gray levels that require roughly 40% to 60% area coverage of halftone dots. In these superimpositions we see that no objectionable moiré is present, which is due to the moiré-free requirement and vector sharing requirements of Equations (6) and (7), respectively.

Additional beneficial properties can be designed into the five-screen configuration. The set of halftone screens can possess a more consistent texture appearance, screen-to-screen, if all the screens in the set are as close to orthogonal as possible. To achieve the consistency, the three screens that do not share vectors with each other should each have their respective fundamental frequency vectors no more than 15° from orthogonal.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image forming method for digitally reproducing a moiré-free color halftone image using a different halftone screen for each of five colors, the method comprising: using a color halftone screening apparatus to perform:

defining a first color halftone screen having a first fundamental frequency vector $V_{a1}$=($V_{a1}$, $\theta_{a1}$), and second fundamental frequency vector $V_{a2}$=($V_{a2}$, $\theta_{a2}$);

defining a second color halftone screen having a first fundamental frequency vector $V_{b1}$=($V_{b1}$, $\theta_{b1}$), and second fundamental frequency vector $V_{b2}$=($V_{b2}$, $\theta_{b2}$);

defining a third color halftone screen having a first fundamental frequency vector $V_{c1}$=($V_{c1}$, $\theta_{c1}$), and second fundamental frequency vector $V_{c2}$=($V_{c2}$, $\theta_{c2}$), where the vector angles obey the ordering $\theta_{ai}$>$\theta_{bi}$>$\theta_{ci}$;

selecting the values of the fundamental frequency vectors to identify combinations that do not produce objectionable moiré by satisfying the following thresholds:

$$|V_{a1}-V_{b1}+V_{c2}| \leq V_{low} \text{ or } |V_{a1}-V_{b1}+V_{c2}| \geq V_{high}$$

and $$|V_{a2}-V_{b2}-V_{c1}| \leq V_{low} \text{ or } |V_{a2}-V_{b2}-V_{c1}| \geq V_{high},$$

where $V_{low}$<0.5 cycle/inch and $V_{high}$>50 cycles/inch;

defining a fourth color halftone screen having a first fundamental frequency vector $V_{d1}$=($V_{d1}$, $\theta_{d1}$), and second fundamental frequency vector $V_{d2}$=($V_{d2}$, $\theta_{d2}$);

defining a fifth color halftone screen having a first fundamental frequency vector $V_{e1}$=($V_{e1}$, $\theta_{e1}$), and second fundamental frequency vector $V_{e2}$=($V_{e2}$, $\theta_{e2}$); and, selecting the values of the fundamental frequency vectors for the fourth screen and fifth screen to satisfy $$V_{d1}, V_{d2} \in [V_{a1}, V_{c1}, V_{b2}], V_{d2} \neq V_{d1}$$

$$V_{e1}, V_{e2} \in [V_{b1}, V_{a2}, V_{c2}], V_{e2} \neq V_{e1};$$

so that the set of five different halftone screens used in combination, in an image forming apparatus, produce moiré-free halftone output.

2. The method of claim 1 wherein the length of $V_{a1}$, $V_{a2}$, $V_{b1}$, $V_{b2}$, $V_{c1}$, and $V_{c2}$ are equal to within 0.5%.

3. The method of claim 1 wherein the second fundamental frequency vector is rotated 90° from the respective first fundamental frequency vector for each of the screens used colors a, b, and c.

4. The method of claim 1 wherein at least two screens of the five screen combination are strictly non-orthogonal.

5. The method of claim 1 wherein the respective first and second fundamental frequency vectors of each of the five halftone screens are within 15° of orthogonal.

6. The method of claim 1 wherein $V_{low}$=0 cycles/inch.

7. The method of claim 1 wherein $V_{low}$=0.2 cycles/inch and $V_{high}$=50 cycles/inch.

8. The method of claim 1 wherein four of the five colors are cyan, magenta, black and yellow.

9. The method of claim 1 wherein one of the five colors is one of orange, green, red, blue, violet, turquoise, emerald, light cyan, light magenta, and gray.

10. The method of claim 1 wherein yellow is halftoned with one of the fourth and fifth halftone screens.

11. A method for generating a plurality of non-orthogonal halftone screen outputs for moiré free color halftoning of five color image separations, the method comprising:

defining, using a color halftoning screening apparatus, a first and a second color halftone screen fundamental frequency vector for each of a first, second, and third clustered dot halftone screen such that the halftone screen set output forms a rosette appearance free of objectionable moiré;

defining, using the color halftoning screening apparatus, a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens; and, defining, using the color halftoning screening apparatus, a fifth color halftone screen where a first fundamental vector of the fourth screen shares a fundamental frequency vector with one of said three halftone screens and a second fundamental frequency vector of the fifth screen shares a fundamental frequency vector with a different one of said three color halftone screens, and neither first or second fundamental frequency vector of the fifth screen are equal to either of the first or second fundamental frequency vectors of the fourth screen.

12. The method of claim 11 wherein the first, second and third halftone screen are orthogonal.

13. The method of claim 11 wherein one of the five colors is one of orange, green, red, blue, violet, turquoise, emerald, light cyan, light magenta, and gray.

14. A color halftoning screening apparatus for reproducing a moiré-free color halftone image using a five halftone screen set consisting of a halftone screen for each color, the apparatus comprising:
- a first color halftone screen having a first fundamental frequency vector $V_{a1}=(V_{a1}, \theta_{a1})$, and second fundamental frequency vector $V_{a2}=(V_{a2}, \theta_{a2})$;
- a second color halftone screen having a first fundamental frequency vector $V_{b1}=(V_{b1}, \theta_{b1})$, and second fundamental frequency vector $V_{b2}=(V_{b2}, \theta_{b2})$;
- a third color halftone screen having a first fundamental frequency vector $V_{c1}=(V_{c1}, \theta_{c1})$, and second fundamental frequency vector $V_{c2}=(V_{c2}, \theta_{c2})$, where the vector angles obey the ordering $\theta_{ai} > \theta_{bi} > \theta_{ci}$ and the values assigned said first and second color halftone screen fundamental frequencies being interrelated by $$|V_{a1}-V_{b1}+V_{c2}| \leq V_{low} \text{ or } |V_{a1}-V_{b1}+V_{c2}| \geq V_{high}$$

and $$|V_{a2}-V_{b2}-V_{c1}| \leq V_{low} \text{ or } |V_{a2}-V_{b2}-V_{c1}| \leq V_{high}$$

where $V_{low} < 0.5$ cycle/inch and $V_{high} > 50$ cycles/inch;
- a fourth color halftone screen having a first fundamental frequency vector $V_{d1}=(V_{d1}, \theta_{d1})$, and second fundamental frequency vector $V_{d2}=(V_{d2}, \theta_{d2})$; and,
- a fifth color halftone screen having a first fundamental frequency vector $V_{e1}=(V_{e1}, \theta_{e1})$, and second fundamental frequency vector $V_{e2}=(V_{e2}, \theta_{e2})$;

where the values assigned to the first and second fundamental frequency vectors for the fourth and fifth screen are related to the fundamental frequency vectors for the first, second and third screens by $$V_{d1}, V_{d2} \square [V_{a1}, V_{c1}, V_{b2}], V_{d2} \neq V_{d1}$$

$$V_{e1}, V_{e2} \square [V_{b1}, V_{a2}, V_{c2}], V_{e2} \neq V_{e1}.$$

15. The apparatus of claim 14 wherein the length of $V_{a1}$, $V_{a2}$, $V_{b1}$, $V_{b2}$, $V_{a1}$, and $V_{c2}$ are equal to within 0.5%.

16. The apparatus of claim 14 wherein the second fundamental frequency vector is rotated 90° from the respective first fundamental frequency vector for each of the screens used for colors a, b, and c.

17. The apparatus of claim 14 wherein four of the five colors are cyan, magenta, black and yellow.

18. The apparatus of claim 14 wherein one of the five colors is one of orange, green, red, blue, violet, turquoise, emerald, light cyan, light magenta, and gray.

19. The apparatus of claim 14 wherein yellow is halftoned with one of the fourth and fifth halftone screens.

20. The apparatus of claim 14 wherein $V_{low}=0.2$ cycles/inch and $V_{high}=50$ cycles/inch.

* * * * *